(12) United States Patent
Myerson et al.

(10) Patent No.: US 6,266,045 B1
(45) Date of Patent: Jul. 24, 2001

(54) INTERACTIVE DISPLAY USER INTERFACE COMPUTER AND METHOD

(75) Inventors: Robert F. Myerson, Captiva Island, FL (US); Yung-Fu Chang, Medina, OH (US); Gary Kochis, Untiontown, OH (US); Donald M. Embree, North Canton, OH (US)

(73) Assignee: Telxon Corporation, Akron, OH (US)

( * ) Notice: Subject to any disclaimer, the term of this patent is extended or adjusted under 35 U.S.C. 154(b) by 0 days.

(21) Appl. No.: 08/341,429

(22) Filed: Nov. 17, 1994

Related U.S. Application Data

(63) Continuation-in-part of application No. 08/268,806, filed on Jun. 30, 1994, now Pat. No. 5,594,470.

(51) Int. Cl.$^7$ ...................................................... G09G 5/00

(52) U.S. Cl. ............................................ 345/156; 345/901

(58) Field of Search ...................................... 345/169–183, 345/901; 178/18–20; 364/900; 340/825.26, 825.27–825.29; 248/917, 918, 919; 341/22, 23, 32, 33; 455/347–351; D14/100, 106, 113, 115; 367/708, 709.1; 379/440, 428; 368/10, 13, 203, 204

(56) References Cited

U.S. PATENT DOCUMENTS

| D. 270,061 | 8/1983 | Ackeret . |
| D. 270,062 | 8/1983 | Ackeret . |
| D. 270,063 | 8/1983 | Ackeret . |

(List continued on next page.)

FOREIGN PATENT DOCUMENTS

| 803268 | 12/1990 | (JP) . |
| 91/04461 | 4/1991 | (WO) . |

OTHER PUBLICATIONS

Telxon Corporation brochure entitled "PTC–1140 Wireless Pen–Based Computer," dated Jan. 1994.
Telxon Corporation brochure entitled "PTC–1180 Wireless Pen–Based Computer Tablet," dated Jan. 1994.
Telxon Corporation brochure entitled "The Wireless Hospital—Time and Cost Saving Solutions for Healthcare Information Networks," copyright 1994.
Magazine article from *Automatic I.D. News* entitled "Pen–Based System to the Rescue: Speeds Fire Inspections and MOre," p. 21, dated Apr. 1994.
Advertisement in Automatic I.D. News Magazine for Monarch Marking Systems, Thermal Transfer Renegade Printer, p. 22, dated Apr. 1994.
Article published by Symbol Technologies, Inc.—"A Primer for Two Dimensional Bar Codes, Portable Data Files, and PDF417", dated Oct. 1990 by Stuart Itkin.
Magazine article from Automatic I.D. News entitled "Pen–based System to the Rescue Speeds Fire Inspectionsand More," p. 21, dated Apr. 1994.

*Primary Examiner*—Chanh Nguyen
(74) *Attorney, Agent, or Firm*—Watts, Hoffmann, Fisher & Heinke, Co., L.P.A.

(57) ABSTRACT

A hand-held portable computer is disclosed. The computer includes a housing at least partially enclosing computer electronics, a visible display screen supported by the computer housing and a handle assembly connected to the computer housing. The handle assembly includes a handle support, a support retainer affixed to the housing at a location opposite the screen and a handle supported by the handle support. The support retainer adjustably connects the handle support to the computer housing. In the preferred embodiment, the handle support is rotatably adjustable with respect to the computer housing. The handle support includes an annular ring having a plurality of indentations on one surface and the support retainer includes a detent which engages a selected one of the indentations to secure the handle support in a desired rotational orientation.

14 Claims, 7 Drawing Sheets

U.S. PATENT DOCUMENTS

| | | |
|---|---|---|
| D. 297,933 | 10/1988 | Bradbury et al. . |
| D. 309,295 | 7/1990 | de la Huerga et al. . |
| D. 314,372 | 2/1991 | Morris . |
| D. 315,549 | 3/1991 | Clough et al. . |
| D. 319,433 | 8/1991 | Pearce . |
| D. 338,656 | 8/1993 | Spayde et al. . |
| 3,356,836 | 12/1967 | Stenby . |
| 3,876,863 | 4/1975 | Boone . |
| 4,237,540 * | 12/1980 | Sato ................................ 345/169 X |
| 4,279,021 | 7/1981 | See et al. . |
| 4,336,530 | 6/1982 | Koike et al. . |
| 4,387,297 | 6/1983 | Swartz et al. . |
| 4,412,751 | 11/1983 | Jeannet et al. . |
| 4,458,238 * | 7/1984 | Learn ................................ 345/169 X |
| 4,460,120 | 7/1984 | Shepard et al. . |
| 4,523,297 | 6/1985 | Ugon et al. . |
| 4,587,630 | 5/1986 | Straton et al. . |
| 4,593,186 | 6/1986 | Swartz et al. . |
| 4,660,221 | 4/1987 | Diugos . |
| 4,664,101 | 5/1987 | Granberg et al. . |
| 4,686,332 | 8/1987 | Greanlas et al. . |
| 4,725,694 | 2/1988 | Auer et al. . |
| 4,758,717 | 7/1988 | Shepard et al. . |
| 4,794,239 | 12/1988 | Allais . |
| 4,835,713 | 5/1989 | Pastor . |
| 4,847,818 | 7/1989 | Olsen . |
| 4,866,642 | 9/1989 | Nahamura et al. . |
| 4,885,580 | 12/1989 | Noto et al. . |
| 4,889,982 | 12/1989 | Young et al. . |
| 4,916,441 | 4/1990 | Gombrich . |
| 4,954,967 | 9/1990 | Takahashi . |
| 4,969,206 | 11/1990 | Desrochers . |
| 5,007,085 | 4/1991 | Greanlas et al. . |
| 5,015,831 | 5/1991 | Eastman et al. . |
| 5,031,119 | 7/1991 | Dulaney et al. . |
| 5,107,253 | 4/1992 | Meadows . |
| 5,110,226 | 5/1992 | Sherman . |
| 5,113,445 | 5/1992 | Wang . |
| 5,123,064 | 6/1992 | Hacker et al. . |
| 5,130,520 | 7/1992 | Shepard et al. . |
| 5,144,120 | 9/1992 | Krichever et al. . |
| 5,202,817 | 4/1993 | Koenck et al. . |
| 5,216,233 | 6/1993 | Main et al. . |
| 5,227,614 | 7/1993 | Danielson et al. . |
| 5,227,617 | 7/1993 | Christopher et al. . |
| 5,237,161 | 8/1993 | Grodevant . |
| 5,243,655 | 9/1993 | Wang . |
| 5,304,786 | 4/1994 | Pavlidis et al. . |
| 5,324,925 | 6/1994 | Koenck et al. . |
| 5,331,136 | 7/1994 | Koenck et al. . |
| 5,337,361 | 8/1994 | Wang et al. . |
| 5,347,115 | 9/1994 | Sherman et al. . |
| 5,349,497 * | 9/1994 | Hanson et al. . |
| 5,367,152 | 11/1994 | Krichever et al. . |

* cited by examiner

INTERACTIVE DISPLAY USER INTERFACE COMPUTER AND METHOD

CROSS-REFERENCE TO RELATED APPLICATION

The present application is a continuation-in-part of U.S. Application Ser. No. 08/268,806 to Meyerson et al. entitled "Configurable Electronic Work Slate Unit" filed on Jun. 30, 1994 now U.S. Pat. No. 5,594,470.

FIELD OF THE INVENTION

This invention relates to a hand-held portable computer and, more particularly, to a hand-held computer with an adjustable handle.

BACKGROUND ART

Hand-held portable computers are used by a variety of enterprises including manufacturing firms, department, grocery and drug stores, transportation companies, package delivery services, insurance firms and utility companies. Hand-held computers are advantageously employed to facilitate such diverse business functions as inventory control, production scheduling and expediting, billing and both package route tracking.

Hand-held computers, including pen computers and touch screen computers, are gaining popularity in the band-held computer market. A pen computer is a portable computer including a housing enclosing a microprocessor and associated circuitry and an interactive visible display screen, often referred to as an electronic workslate. Instead of using a keyboard to enter data and initiate processing routines, a pen computer utilizes either a cordless electromagnetic pen or an electromagnetic pen tethered to the housing to interact with the microprocessor. By appropriately touching the display screen with the pen, a user may input data and access stored data, boot up an operating system, change screen displays or menus, select and run programs from a set of application and utility programs stored in computer memory and enter processing or query commands. The pen computer also includes a transceiver for transmitting and receiving data via radio frequency signals and input/output ports to interface with various devices.

A touch screen computer is similar to a pen computer but, instead of using an electromagnetic pen to interface with the computer, a touch sensitive display screen is provided and the user interfaces with the computer by appropriately touching areas of the display screen with his or her finger to execute commands, enter data, respond to prompts, etc.

As user mobility is a key advantage of hand-held computers, such computers will often be operated by a user who is standing or walking, e.g., a user entering inventory data into the computer while walking through a warehouse. To use a pen computer in a standing position, the electronic pen is grasped in the user's writing hand while the housing is supported in the other hand by grasping an edge of the housing with the hand such that the user's fingers extend over a bottom surface of the housing and a thumb extends over a portion of an upper surface of the computer housing. Alternately, the computer may be supported by the user's forearm. In this position, a lower surface of the computer rests on the forearm and palm and the user grips the computer by curling his or her fingers curl over an edge of the housing. Either method of holding the computer is awkward and tiring and requires an application of significant force by user to grip the computer. In addition, repetitive use of the computer can cause discomfort because the user must angle his or her wrist to orient the display screen in a readable position.

The weight of a pen computer is appreciable, approximately five pounds. Holding such a five pound instrument for extended periods with one hand will induce fatigue in the user's grasping hand, wrist and arm. Compounding this problem is the fact that the user must use the pen in his or her writing hand, thereby precluding the possibility of alternating the hand holding the computer to ameliorate fatigue.

Similarly, a touch screen computer is held in one hand or supported by the user's forearm as described above. The user employs the index finger of his or her free hand (usually the writing hand) to appropriately touch the screen. Ergonomic theories teach the importance of designing products suitable to human physiological capabilities and limitations. A pen computer or touch screen computer which does not provide an ergonomically proper means of holding and positioning the computer can lead to a marked decline in user productivity as the work day continues as a result of increasing fatigue. Additionally, subjecting a user of a pen or touch screen computer to hand, wrist and arm fatigue may result in long term health problems such as carpal tunnel syndrome.

DISCLOSURE OF THE INVENTION

A hand-held portable computer made according to this invention includes a housing at least partially enclosing computer electronics, a visible display screen supported by the housing and a handle assembly connected to the housing. The handle assembly includes a handle support, a support retainer affixed to the housing at a location opposite the screen and a handle supported by the handle support. The support retainer adjustably connects the handle support to the housing.

In the preferred embodiment, the handle support is rotatably adjustable with respect to the housing. The handle support includes an annular ring having a indentations on one surface and the support retainer includes a detent which engages an aligned one of the indentations to secure the handle support in a desired rotational orientation. The support retainer further includes an annular surface and shoulder adjacent its outer periphery providing thrust and bearing surfaces for the handle support annular ring. The annular ring includes a pair of handle attachment members which extend outwardly from the annular ring and away from the housing. The handle attachment members optionally support a plurality of handle configurations.

As the handle support and handle may be rotatably adjusted with respect to the housing, a user of the pen computer will choose a rotation orientation which is comfortable and secure. If the user tires of a chosen handle orientation, the position of the handle may be expeditiously changed to a new desired position. Additionally, a variety of handle configurations afford the user the opportunity to select an ergonomically proper handle size and shape.

In an alternate embodiment, the handle assembly functions as a universal joint in that it is both rotatably and pivotably adjustable with respect to the housing. The handle assembly includes a handle support rotatably affixed to the housing, a pair of handle attachment extensions hinged to the handle support and a handle supported by the pair of handle attachment extensions. A cam latching mechanism secures the handle support in a desired rotational orientation with respect to the housing. A surface of the housing facing the handle support assembly includes a plurality of aligned indentations. A detent affixed to the handle support interfits with an aligned one of the indentations to secure the handle support in the desired rotational orientation. Another cam latching mechanism secures the handle attachment extensions and the handle in a desired angular position with respect to the housing. The cam latching mechanism includes a plurality of indentations on one of the handle support and the handle attachment extension and other of the handle support and handle attachment extension has a detent which engages an aligned one of the indentations to secure the handle attachment extension in the desired angular orientation.

This embodiment provides an additional flexibility in positioning the handle as the handle is both rotationally and pivotably adjustable with respect to the housing. The handle may be advantageously pivoted to a position adjacent the housing when the computer is not being used thereby moving the handle out of harm's way, providing a streamlined appearance and occupying a minimum of space.

In a third embodiment, the computer includes a display screen housing supporting a visible display screen and a computer housing and handle assembly. The computer housing and handle assembly is rotatably affixed to the display screen housing. The computer housing and handle assembly includes a computer housing which encloses computer electronics, a handle subassembly is coupled to the computer housing and includes a handle for holding the computer and a cam latching mechanism to secure the computer housing and handle assembly in a desired rotational orientation with respect to the display screen housing. The cam latching mechanism includes a plurality of indentations on one of the display screen housing and the housing and handle assembly and the other of the two includes a detent which engages an aligned one of the indentations to secure the housing and handle assembly in the desired rotational orientation. The latching cam mechanism further includes a detent biasing means for biasing the detent to engage the aligned indentation.

In another embodiment, the handle assembly includes a raised member which slidably interfits in a slot in the computer housing. The user can slide the handle assembly along a path of travel parallel to a surface of the computer housing to a selected position.

These and other objects, advantages and features of the invention will become better understood from a detailed description of a preferred embodiment which is described in conjunction with the accompanying drawings.

BRIEF DESCRIPTION OF THE DRAWINGS

FIG. 3A is an enlarged sectional view of a cam latching mechanism of the handle assembly as seen from the plane indicated by line 3A—3A of FIG. 2, an engaged position being shown in solid and a nonengaged position being shown in phantom;

FIG. 8A is a top plan view of the computer of FIG. 7.

DETAILED DESCRIPTION

Figure 1:
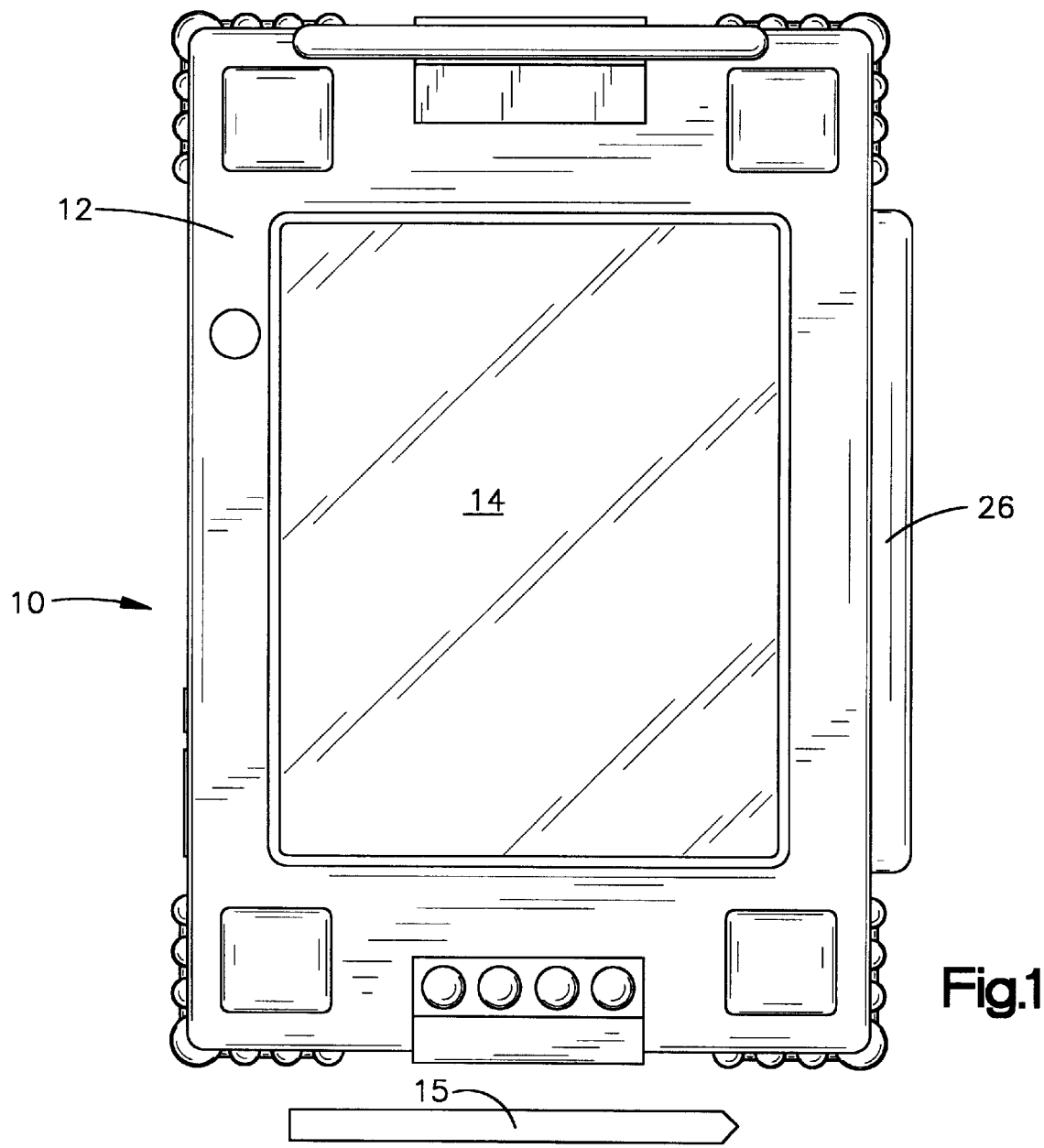
FIG. 1 is a top plan view of the hand-held computer of the present invention.
Figure 2:
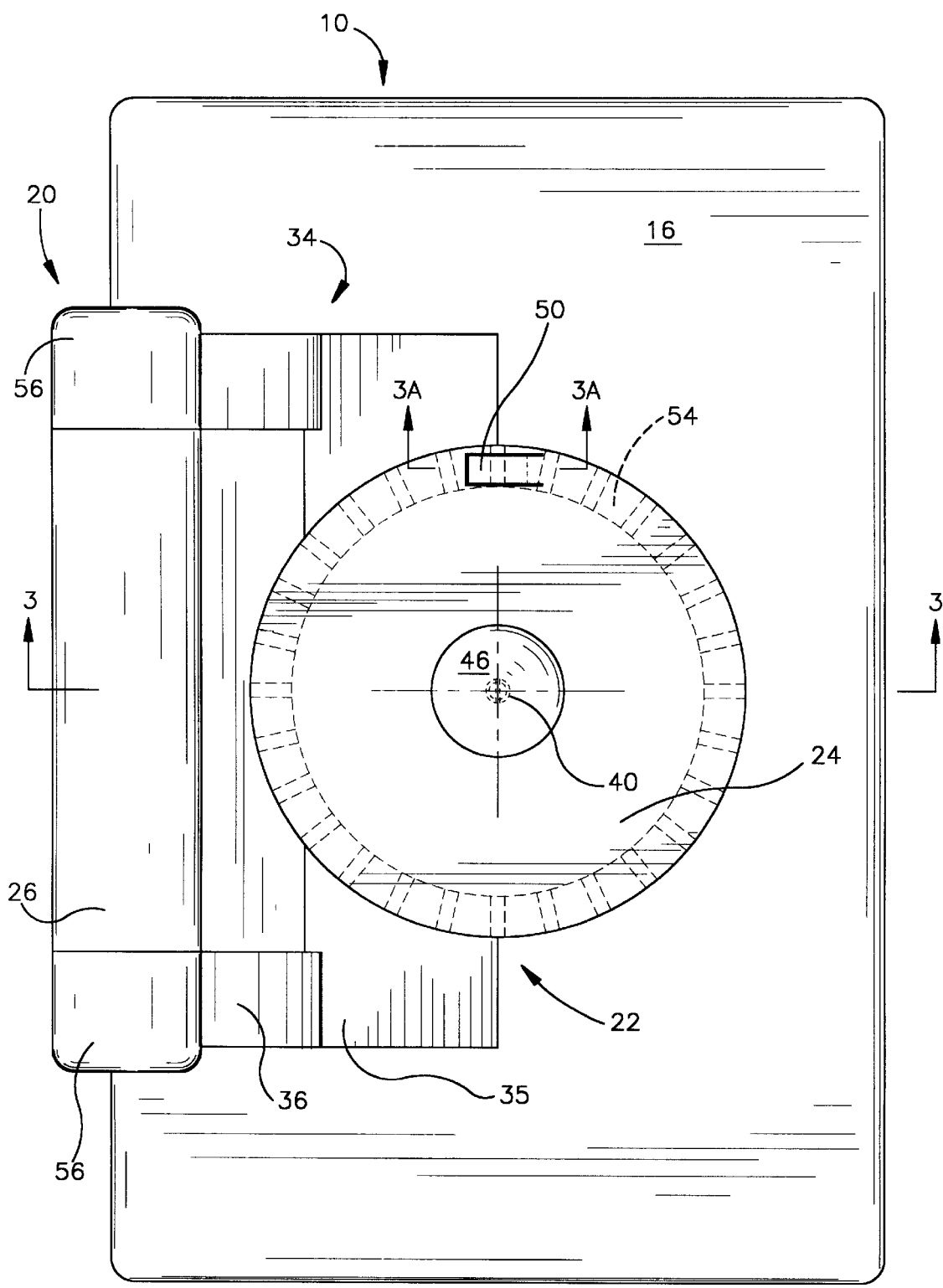
FIG. 2 is a bottom plan view of the computer of FIG. 1 showing a rotatably adjustable handle assembly.
Figure 3:
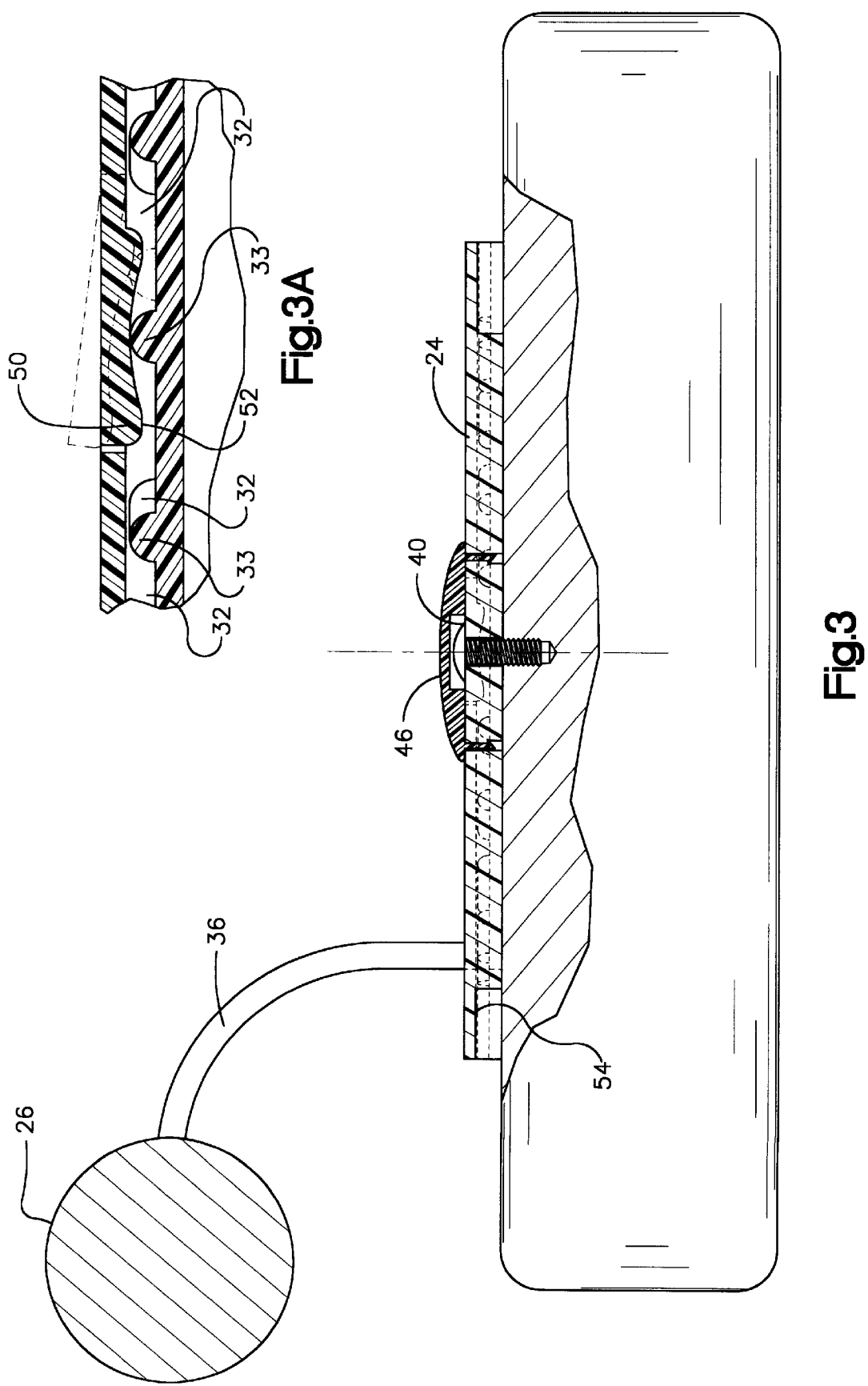
FIG. 3 is a view, partially in elevation and partially in section, of the computer shown in FIG. 1, the sectional portion of the view as seen from the plane indicated by line 3—3 of FIG. 2.

Turning to the drawings, FIGS. 1–4 illustrate the preferred embodiment of a hand-held computer, shown generally at 10. The computer 10 includes a housing 12 enclosing a microprocessor (not shown) and associated computer circuitry (not shown). An interactive display screen 14 (FIG. 1) is coupled to and forms a part of the housing 12. An electronic pen 15, which is not attached to the computer 10, is employed by a user of the computer to input data and commands by appropriately touching a tip of the pen to the display screen 14. Of course, it should be appreciated that the electronic pen 15 may be tethered to the housing 12. A handle assembly 20 is attached to the housing 12 adjacent a housing surface 16 opposite the display screen 14.

Figure 4:
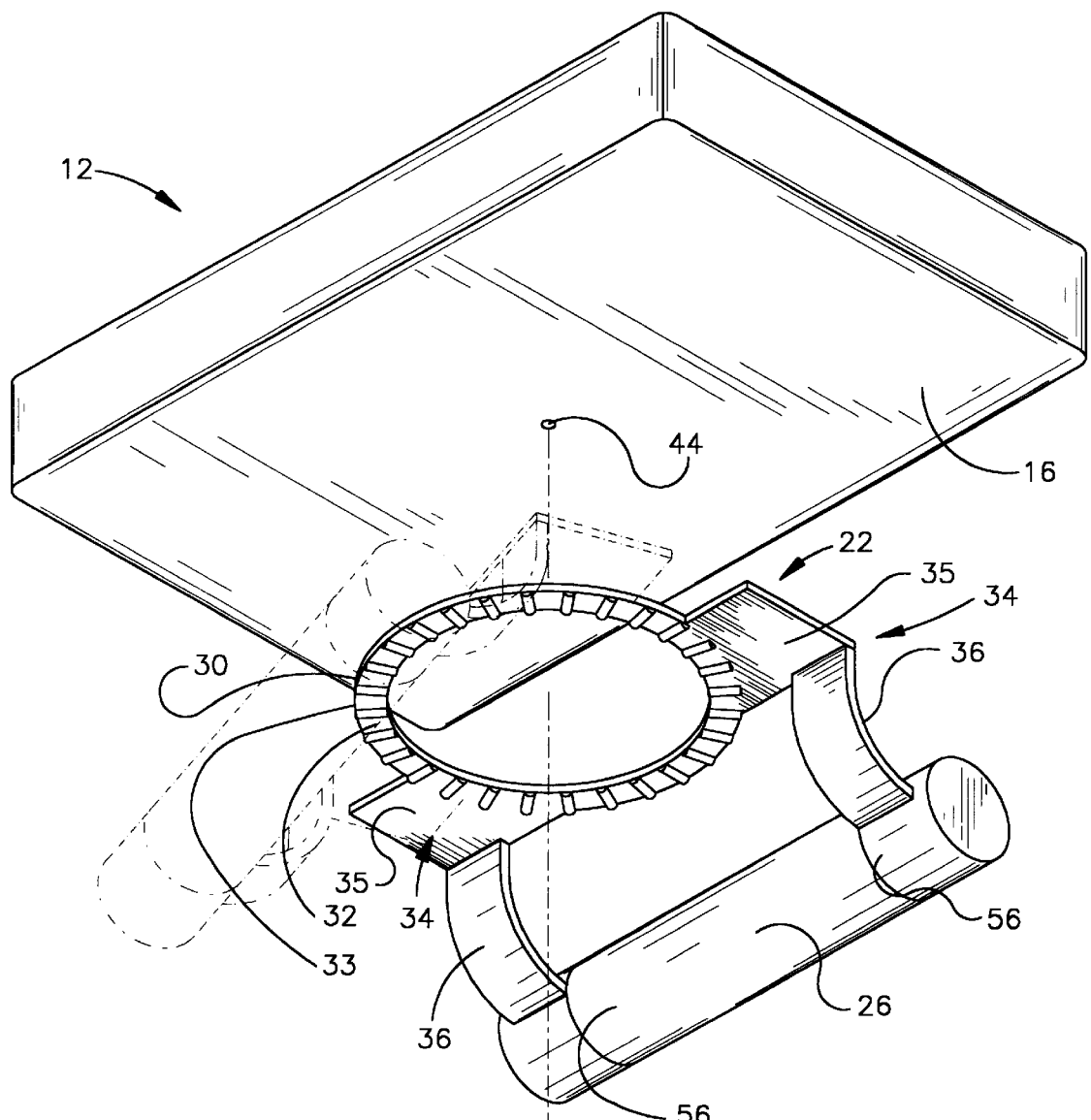
FIG. 4 is an exploded view of the handle assembly of FIG. 2, a second position of a handle support and handle are shown in phantom.

As best seen in FIG. 4, the handle assembly 20 includes a handle support 22, a support retainer 24 and a handle 26. The handle support 22 includes an annular ring 30 having a plurality of indentations 32 separated by rounded raised cam portions or ridges 33. The cam portions 33 are formed in a housing support surface facing the support retainer 24. The handle support 22 also includes a pair of handle attachment members 34. Each handle attachment member 34 includes an extending portion 35 which extends outwardly from the annular ring 30 and an angled portion 36 extending away from the housing surface 16.

The annular ring 30 is rotatably secured between the support retainer 24 and the housing surface 16. A screw 40 connects the support retainer 24 to the housing 12 and, thereby, secures the handle support 22 in place. The screw 40 extends through an aperture 42 in the support retainer 24 and is threaded intd a bore 44 in the housing 12. To provide a clean appearance, a cap 46 snaps onto the support retainer 24 and overlies a bead portion of the screw 40.

The annular ring 30 is rotatable with respect to the housing 12 and the support retainer 24. If the coupling between the support retainer 24 and the housing 12 provided by the screw 40 is sufficiently tight, the frictional forces opposing relative movement between the annular ring 30 and the housing and support retainer will be sufficient to hold the handle support 22 in a desired rotational position with respect to the housing. Friction brake (not shown) could be used to secure the handle support in the desired position. Preferably, however, the support retainer 24 includes a cam latching mechanism in the form of a detent 50 which interfits into an aligned one of the annular ring indentions 32. As can best be seen in FIG. 34, the detent 50 is biased toward engaged positions. The biasing of the detent 50 toward engaged positions may result from the resiliency of a material the detent is comprised of, for example, polypropylene or another resilient plastic or vinyl material. Alternately and preferably, a spring (not shown) is operably interposed between the detent and a surface of the support retainer to provide the desired engagement biasing.

To rotate the handle support 22 with respect to the housing 12, the user holds the housing with one hand and grasps the handle 26 with the other hand and relatively rotates them. Two handle positions (one being in phantom) are shown in FIG. 4. When a sufficient force is applied to the handle 26, the attached annular ring 30 will rotate with respect to the housing 12 and the support retainer 24. The detent 50, affixed to the support retainer 24, remains rotatively stationary and functions as a cam follower as it bears against and follows the rotating annular ring surface. As shown in phantom in FIG. 3A, the detent 50 will be displaced from its indentation engaged position when a ridge 33, separating adjacent indentations 32, cams the detent. The detent 50 will ride up one face of the ridge and down an opposing face as the annular ring 30 is rotated. The camming action of the detent 50 is facilitated by a tapered surface contour of the ridges 33. Additionally, a bearing surface 52 of the detent 50 is also tapered. Once the handle 26 is in the desired rotational position with respect to the housing 12, the computer 10 is ready for operation.

The support retainer 24 further includes an annular surface and shoulder 54 (shown in FIG. 3 and in phantom in FIG. 2) adjacent an outer peripheral surface which provides thrust bearing and radial bearing surfaces for the annular ring 30. The angled portions 36 of the handle attachment members 34 terminate in end pieces 56 which include recessed portions (not shown) having central apertures. The handle 26 is secured between the recessed endpieces. A selected one of a variety of handle configurations may be employed a including straight cylindrical handle (shown in FIGS. 1–4), an arcuate handle (shown in FIGS. 5 and 6), etc.

Figure 5:
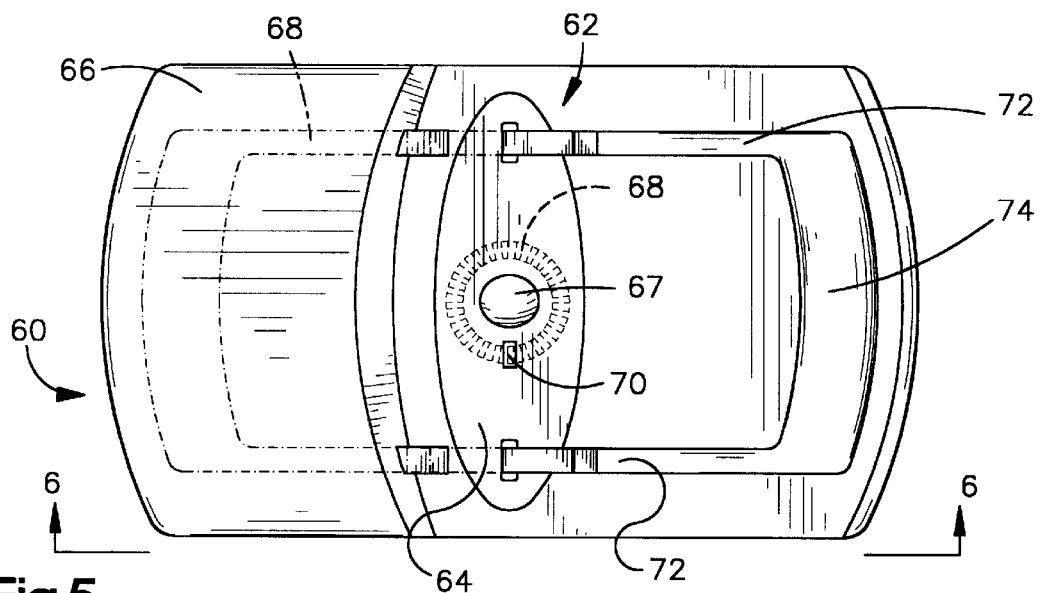
FIG. 5 is a bottom plan view of a hand-held computer having a pivoting and rotatably adjustable handle assembly.
Figure 6:
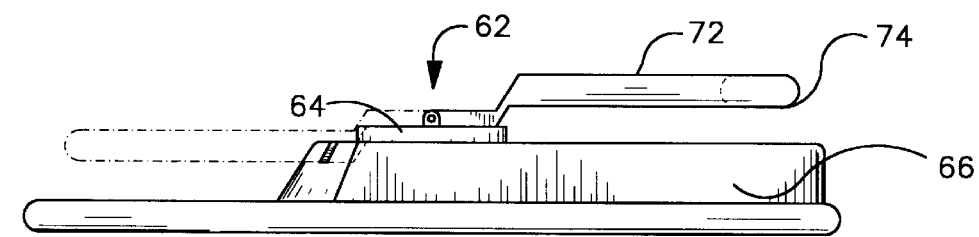
FIG. 6 is an elevation view of the computer of FIG. 5 as seen from the plane indicated by line 6—6 of FIG. 5.

An alternate embodiment of the present invention is illustrated in FIGS. 5 and 6. In this embodiment, a pen computer 60 includes a handle assembly 62 including handle support 64 rotatably attached to a computer housing 66. A screw (not shown) overlied by a cap 67 secures the handle support 64 to the housing 66. A surface of the computer housing 66 includes an aligned plurality of indentations 68 spaced apart by raise cam portions or ridges. The indentations 68 define a camming surface for a detent 70 protruding from a surface of the handle support 64 facing the housing 66. The detent and camming surface comprise a cam latching mechanism which secures the handle support 64 in a desired rotational orientation with respect to the housing 66.

Additionally, the handle assembly 62 includes a pair of handle attachment extensions 72. The handle attachment extensions 72 support an arcuately curved handle 74 and are hinged to the handle support 64 for pivotal adjustment with respect to the housing 66. Another cam latching mechanism is provided to secure the handle attachment extensions 72 in a selected angular relationship with respect to the housing 66. The cam latching mechanism includes a detent (not shown) affixed to one of the handle support extensions 68. This detent interfits with a selected one of an aligned plurality of indentations (not shown) on the handle support 64 to secure the handle attachment extensions 72 in the desired angular orientation with respect to the housing 66.

Extreme adjustment positions of the handle support extensions 72 and the handle 74 are respectively shown in phantom and solid lines in FIGS. 5 and 6. The phantom position would be used when the computer 60 is not in operation. As can be seen in FIG. 6, the phantom position provides a "low profile" look to the computer and positions the handle 74 and handle attachment extensions 72 out of harm's way.

Figure 7:
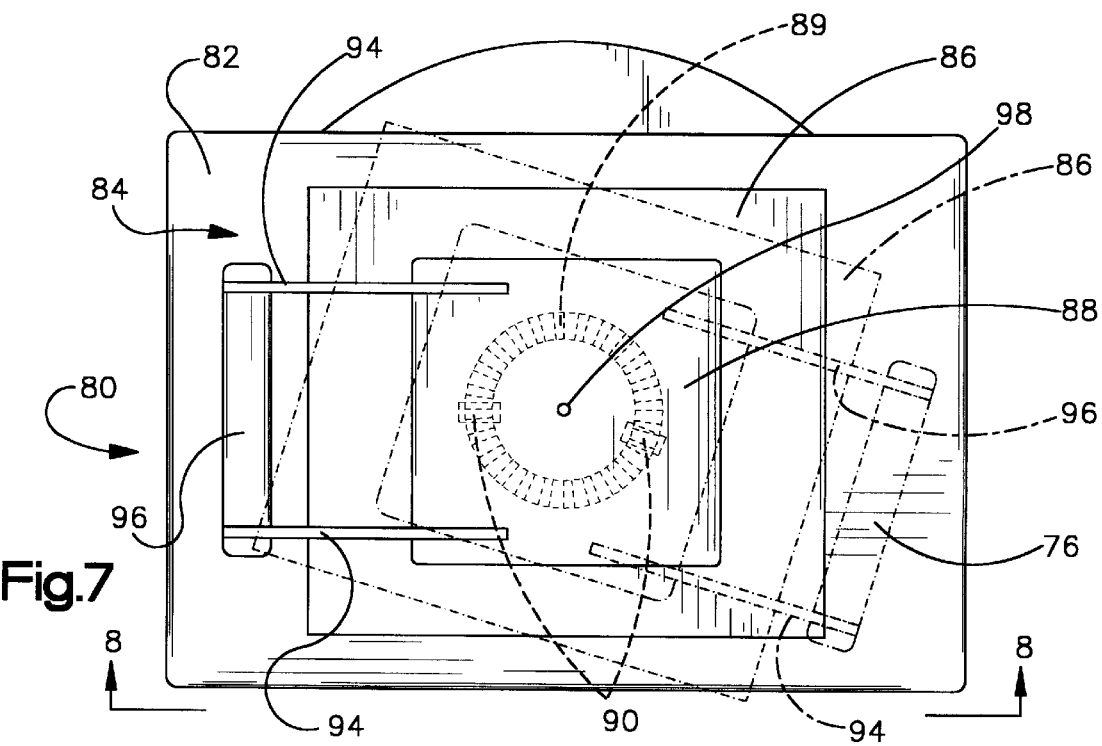
FIG. 7 is a bottom plan view of a held computer having a housing rotatably adjustable with respect to a visible display screen.
Figure 8:
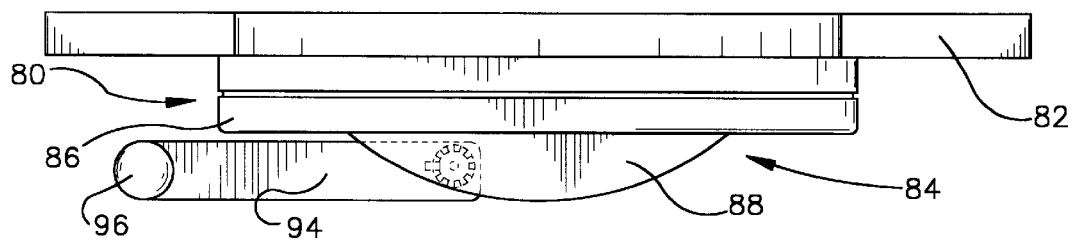
FIG. 8 is an elevation view of the computer of FIG. 7 as seen from the plane indicated by line 8—8 of FIG. 7.

A third embodiment of the present invention is shown in FIGS. 7, 8, and 8A. In this embodiment, a hand-held computer 80 includes a display screen housing 82 supporting a display screen. The computer 80 also includes a computer housing and handle assembly 84 rotatably secured to the display screen housing 82. The computer housing and handle assembly 84 is rotatably turned to the display screen housing 82 for relative rotation about an axis substantially perpendicular to a visible surface of the display screen 97. A surface of the display screen housing 82 includes an aligned plurality of indentations 89 (shown in phantom in FIG. 7) spaced apart by, raised cam portions or ridges (also shown in phantom). The indentations 89, and ridges define a camming surface for a detent 90 protruding from a surface of the computer housing 86 facing the display screen housing 82. The detent and camming surface comprise a cam latching mechanism which secures the computer housing and handle assembly 84 in a desired rotational orientation with respect to the display screen housing 82. Alternately, the positions of the detent 90 and camming surface may be reversed, that is, the aligned plurality of indentations 88 may be disposed on a surface of the computer housing 86 and the detent 90 may protrude from a surface of the display screen housing 82 facing the computer housing 86.

The handle assembly 88 also includes a pair of handle attachment extensions 94 supporting a handle 96. The handle attachment extensions 94 are hinged to a support member (not shown) of the handle assembly 88 so as to pivot with respect to the display screen housing 82. Another cam latching mechanism is provided to secure the handle attachment extensions 94 in a desired angular orientation with respect to the display screen housing 82 as described in the previous embodiment.

Figure 9:
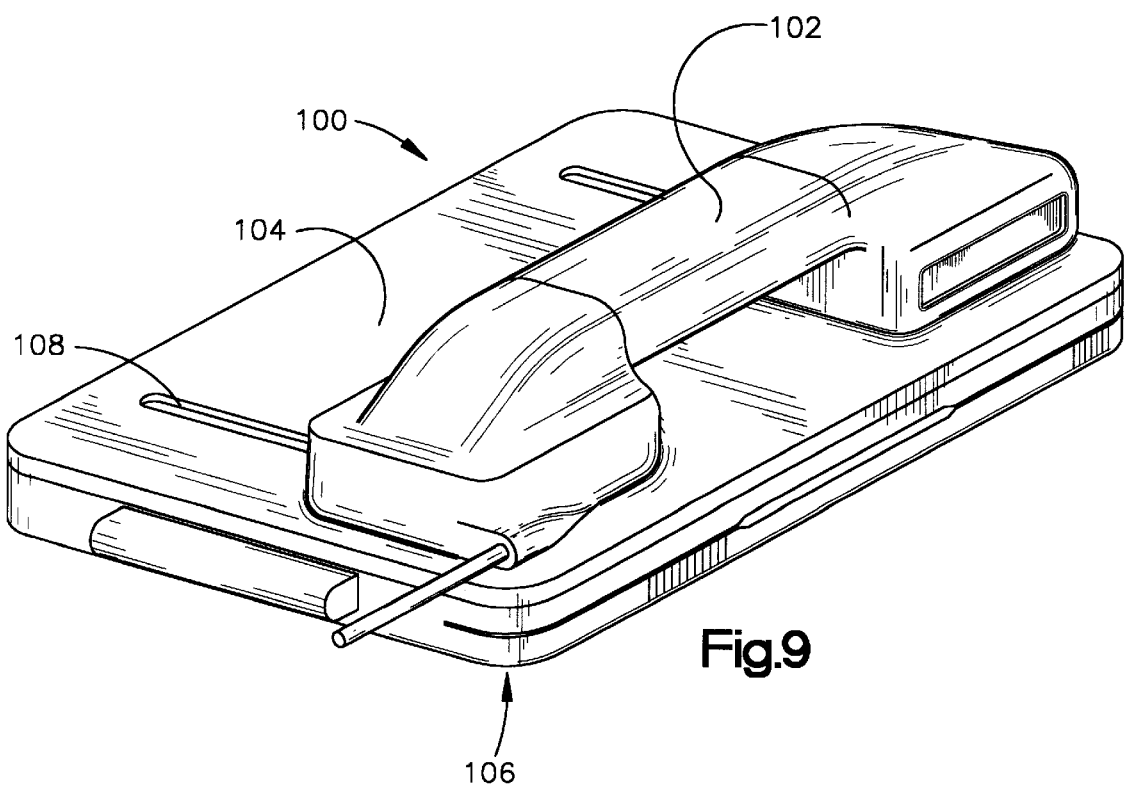
FIG. 9 is a perspective view of a hand-held computer having an adjustable handle assembly which a user may selectively position along a path of travel parallel to a surface of the computer housing.
Figure 10:
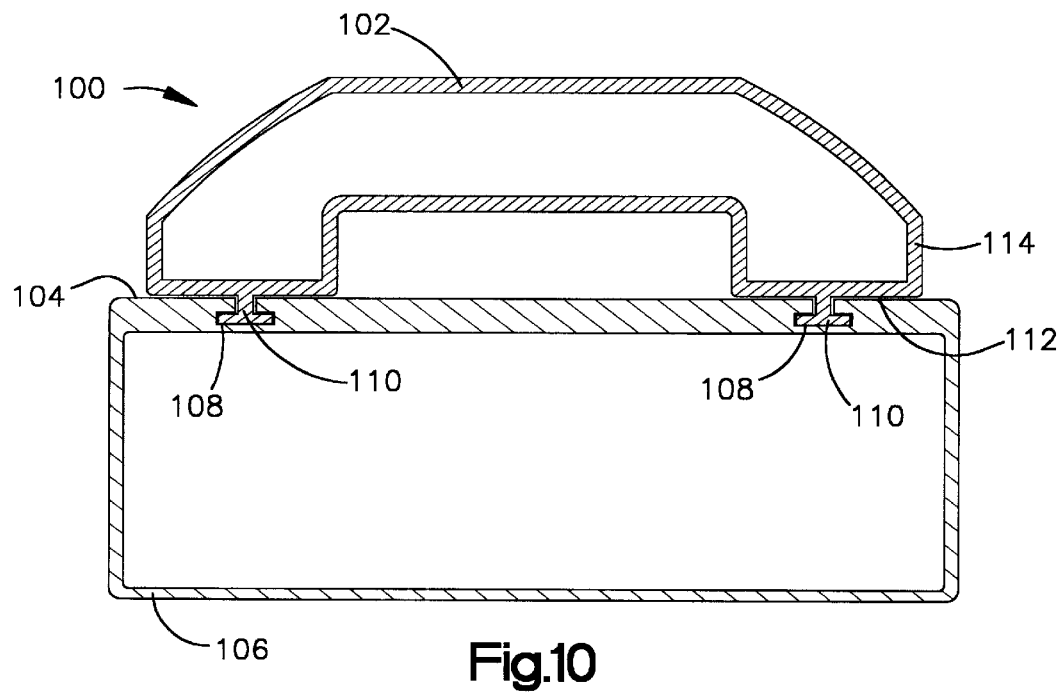
FIG. 10 is an enlarged sectional view showing the attachment structure of the handle assembly and the housing of the hand-held computer of FIG. 9 showing the attachment structure between the handle assembly and the housing.

A fourth embodiment of the present invention is shown in FIGS. 9 and 10. In this embodiment, a hand-held computer 100 includes a handle assembly 102 slidably adjustable in a line parallel to a surface 104 of a housing 106. The housing surface 104 preferably includes two spaced-apart parallel slots 108 (although it should be understood that one slot would be sufficient to perform the function). As can best be seen in FIG. 10, the handle assembly 102 includes two parallel extensions 110 which extend from a base 112 of a hand support 114 and slidably interfit in respective slots 108. The extensions 110 are T-shaped in cross-section and are sized to snugly interfit in the slots 108. The interfit is tight enough such that frictional forces prevent the handle assembly 102 from freely moving along its path of travel but not so tight as to prevent the user from moving the handle assembly by applying a force to he or she desires to change the handle position.

Alternately, a cam latching mechanism could be provided to insure positive latching of the handle assembly 102 in the selected position. The cam latching mechanism would be comprised of a plurality of surface indentations (not shown) in a portion of one of the slots 108 and an interfitting detent (not shown) extending from a corresponding surface of the one of the handle assembly extensions 110. Alternatively, the relative positions of the surface indentations and the detent could be reversed, with the plurality of surface indentations (not shown) in a portion of one of the handle assembly extensions 110 and the detent (not shown) extending from a corresponding surface of the one of the handle assembly extensions 110.

Figure 11:
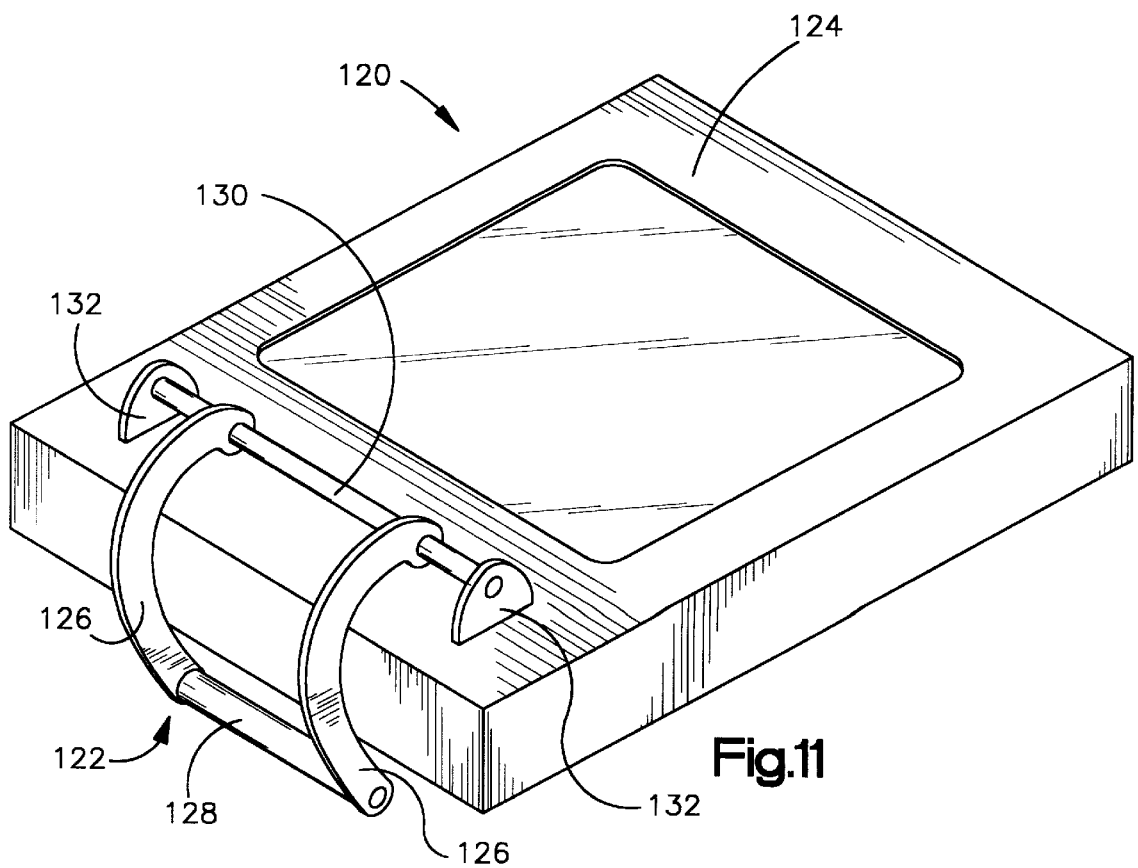
FIG. 11 is a perspective view of a hand-held computer having a pivoting handle assembly wherein the handle assembly is affixed to an upper surface of a housing, the upper surface of the housing supporting a video display screen.

Yet another embodiment of a hand-held computer 120 of the present invention is shown in FIG. 11. In this embodiment, a handle assembly 122 is pivotably adjustable with respect to a housing 124. The handle assembly 122 includes a pair of handle attachment extensions 126 supporting a handle 128. The handle extensions 126 are affixed to a cylindrical pin 130. Ends of the-pin 130 are rotatably supported by flanges 132 extending from the housing upper surface.

A cam latching mechanism is provided to permit the handle attachment extensions 126 to be pivotably adjusted and secured in a selected angular relationship with respect to the housing upper surface. The cam latching mechanism includes a detent (not shown) affixed to one of the handle attachment extensions 126. This detent interfits with a selected one of an aligned plurality of indentations (not shown) on one of the flanges 132 to secure the handle attachment extensions 72 in the selected position. Alternatively, the cam latching mechanism could reverse the respective positions of the detent and the plurality of indentations, with the detent affixed to one of the flanges 132 and the plurality of indentations on the handle attachment extensions 72.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

What is claimed is:

1. A hand-held computer for supplying data to and receiving data from a user, the computer comprising:
   a) a display screen housing for supporting an interactive display screen having a generally planar visible display surface;
   b) a computer housing and handle assembly rotatably connected to the display screen housing for rotation with respect to the interactive display about an axis substantially perpendicular to the display surface, the computer housing and handle assembly defining an internal space for housing computer components for providing displays on the screen and receiving and processing user provided information input via the screen; and
   c) the computer housing and handle assembly including a handle subassembly for use by a user in supporting the computer, a relative rotational movement between the display screen housing and the computer housing and handle assembly permitting a user to relatively position the handle and the screen to an ergonomically acceptable position for support of the computer with one hand and data input with a user's other hand.

2. The hand-held computer of claim 1 wherein the handle subassembly further includes a handle attachment extension, one end of the handle attachment extension pivotably coupled to the computer housing and handle assembly and an opposite end of the handle attachment extension coupled to and supporting the handle.

3. The hand-held computer of claim 1 wherein the handle subassembly includes a peripheral surface comprising a portion of a lower surface of the computer housing and handle assembly and further includes a pair of spaced apart handle attachment extensions, each of the handle attachment extensions having one end pivotably connected to the handle subassembly peripheral surface and the opposite ends of the spaced apart handle attachment extensions supporting the handle.

4. The hand-held computer of claim 1 wherein a portion of an outer surface of the display screen housing and a portion of an outer surface of the computer housing and handle assembly are adjacent and include a cam latching mechanism to secure the display screen housing in a selected one of a plurality of rotational orientations with respect to the computer housing and handle assembly.

5. The hand-held computer of claim 1 wherein the computer is a touch screen computer having a touch sensitive display screen.

6. A hand-held portable computer comprising:
   a) a computer housing at least partially enclosing computer electronics;
   b) a visible display screen supported by a display screen housing the computer housing rotatably connected to the display screen housing for rotation with respect to the display screen about an axis substantially perpendicular to a generally planar visible display surface of the display screen;
   c) a handle assembly extending from the computer housing in a direction away from the display screen housing and rotating with the computer housing, the handle assembly including:
      i) a handle attachment extension, one end of the handle attachment extension being coupled to the computer housing for pivoting movement with respect to the housing; and
      ii) a handle supported by the handle attachment extension.

7. The hand-held portable computer of claim 6, wherein the display screen is interactive.

8. The hand-held portable computer of claim 6 wherein a portion of an outer surface of the handle attachment extension and a portion of an outer surface of the computer housing are adjacent and include a cam latching mechanism to secure the handle attachment extension in a selected one of a plurality of pivoting orientations with respect to the computer housing.

9. The hand-held portable computer of claim 6 wherein a portion of an outer surface of the display screen housing and a portion of an outer surface of the computer housing are adjacent and include a cam latching mechanism to secure the display screen housing in a selected one of a plurality of rotational orientations with respect to the computer housing.

10. A hand-held portable computer comprising:
    a) a display screen housing supporting a generally planar visible display screen;
    b) a computer housing and handle assembly rotatably affixed to the display screen housing for rotation with respect to the display screen about an axis substantially perpendicular to the visible display screen, the computer housing and handle assembly including:
       i) a computer housing at least partially enclosing computer electronics,
       ii) a handle subassembly coupled to the computer housing and including a handle for holding the computer; and iii) a latching mechanism to secure the computer housing and handle assembly in a desired rotational orientation with respect to the display screen housing.

11. The hand-held portable computer of claim 10 wherein the housing and handle assembly latching mechanism comprises a cam latching mechanism including a plurality of indentations on one of the display screen housing and the computer housing and handle assembly and the other of the display housing and the computer housing and handle assembly having a detent which releasably engages an aligned one of the indentations to secure the computer housing and handle assembly in the desired rotational orientation with respect to the display screen housing.

12. The hand-held portable computer of claim 11 wherein the computer housing and handle assembly cam latching mechanism includes a detent biasing means for biasing the detent toward engagement with the aligned indention.

13. A method of inputting data into a hand-held portable computer by a user of the computer, the computer including an interactive display screen supported by a display screen housing and a computer housing rotatably coupled to the display screen housing for an with respect to the display screen about an axis substantially perpendicular to a generally planar visible surface of the display screen the display screen adapted to receive data via contact with an exposed surface of the screen, the computer housing including a handle assembly extending from a portion of the computer housing facing away from the display screen, the handle assembly including a handle for holding the computer, the steps of the method comb:

a) rotating the display screen housing with respect to the computer housing until the display screen and computer housing are in an ergonomically comfortable relative position;

b) gasping the handle with one hand to position the display screen in a desired position for imputing data; and, c) contacting the exposed surface of the display screen using another hand to input data as the screen is hold in the desired position.

14. The method of inputting data into the portable hand-held computer set forth in claim 13 wherein the handle is selectively pivotable, between a plurality of positions with respect to the computer housing and in step (b) the method further includes the substep of pivoting the handle until the display screen is in a desired position.

\* \* \* \* \*

UNITED STATES PATENT AND TRADEMARK OFFICE
CERTIFICATE OF CORRECTION

| | | |
|---|---|---|
| PATENT NO. | : 6,266,045 B1 | Page 1 of 1 |
| DATED | : July 24, 2001 | |
| INVENTOR(S) | : Meyerson et al. | |

It is certified that error appears in the above-identified patent and that said Letters Patent is hereby corrected as shown below:

Title page,
The following should be deleted.

[75] Inventors: Robert F. Myerson, Captiva Island, FL (US); Yung-Fu Chang, Medina, OH (US), Gary Kochis, Untiontown, OH (US); Donald M. Embree, North Cantron, OH (US)

The following should be added.

[75] Inventors: Robert F. Meyerson, Captiva Island, FL (US); Yung-Fu Chang, Medina, OH (US), Gary Kochis, Uniontown, OH (US); Donald M. Embree, North Cantron, OH (US)

Signed and Sealed this

Twelfth Day of March, 2002

Attest:

JAMES E. ROGAN
Attesting Officer    *Director of the United States Patent and Trademark Office*